Oct. 23, 1962  E. P. HARRIS  3,059,292
SEALING STRIP

Filed Jan. 28, 1960  2 Sheets-Sheet 1

INVENTOR.
Edward P. Harris
BY
His Attorney

Oct. 23, 1962 E. P. HARRIS 3,059,292
SEALING STRIP
Filed Jan. 28, 1960 2 Sheets-Sheet 2
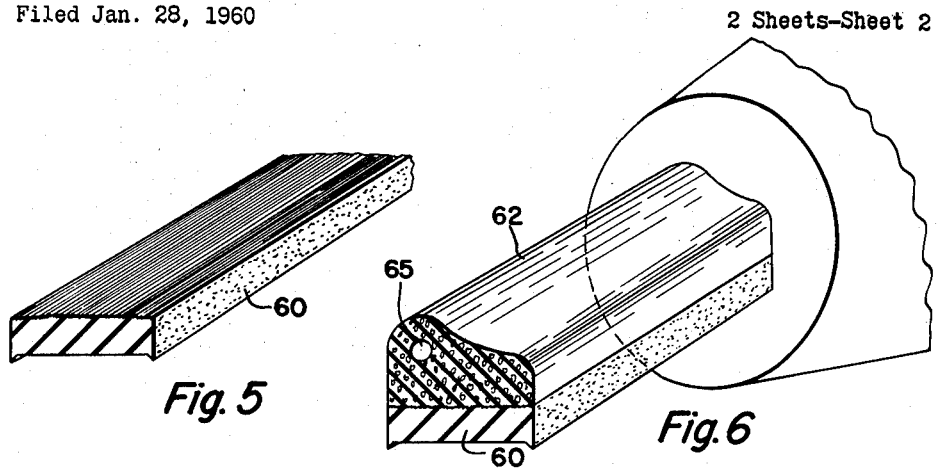
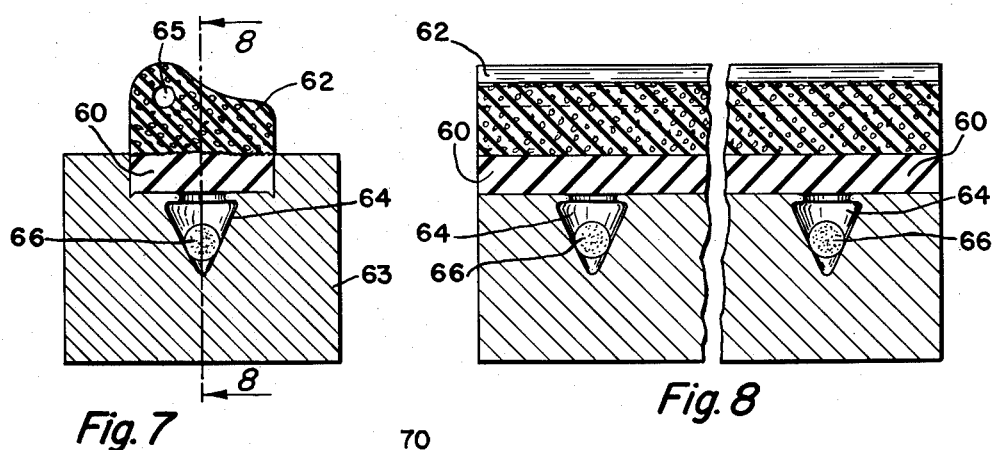
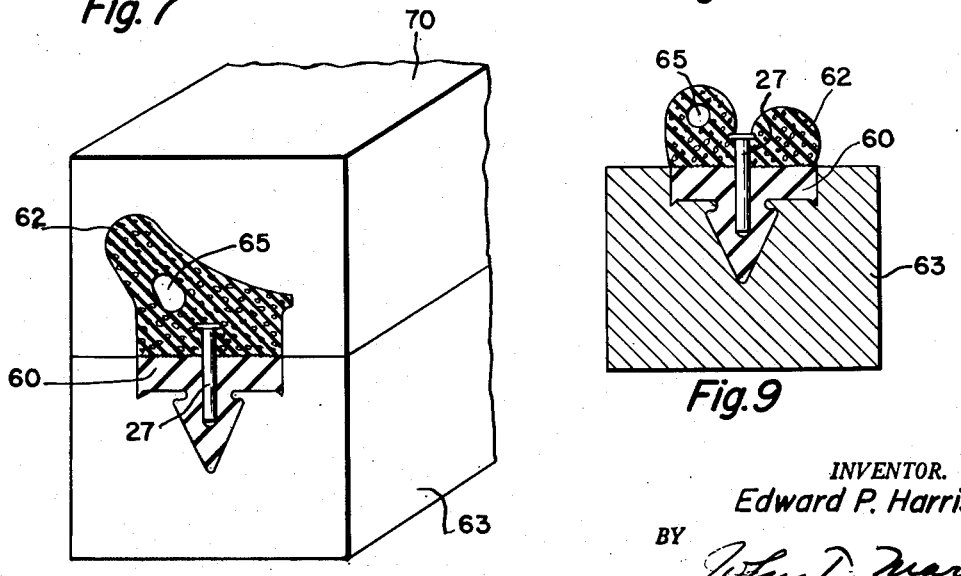
INVENTOR.
Edward P. Harris
BY
His Attorney

United States Patent Office 3,059,292
Patented Oct. 23, 1962

3,059,292
SEALING STRIP
Edward P. Harris, Dayton, Ohio, assignor to General Motors Corporation, Detroit, Mich., a corporation of Delaware
Filed Jan. 28, 1960, Ser. No. 5,261
8 Claims. (Cl. 20—69)

This invention relates to sealing strips and is particularly concerned with sealing strips having integrally formed attachment means thereon.

The sealing strips to be described hereinafter are of the flexible type used as a means for sealing around the marginal edges of vehicle doors and the like to seal out the weather. A useful type of strip of this general character is shown in my Patent 2,579,072 wherein the strip may be attached to the door or door frame by means of a plurality of wire clips. Another type of strip used for the same general purpose is described and claimed in my Patent 2,716,787 wherein the attachment means are rubber plugs carried by a strip of material embedded in the sealing strip which is generally made of foamed rubber or expanded rubber. The present invention is an improvement on the sealing strip shown in either of my previous patents wherein rubber attachments are utilized and wherein rigid means are supplied with each attachment point to facilitate the application of the strip to the supporting member.

In this connection, strips of the character shown in my Patent 2,716,787 having wire attachments sometimes cause difficulty by permitting water, which passes into the door along the window of an automobile due to driving rain, to leak out around the wire attachment points into the interior of the vehicle. This necessitates the application of sealing compound around these apertures or the use of plastic caps over the wire attachment points as clearly disclosed in my copending application Serial No. 750,321, filed July 23, 1958, now abandoned. These caps tend to seal the apertures and prevent leakage outwardly from the interior of the door.

When rubber or elastomeric attachment points are used as shown in my Patent 2,716,787, it has been found that the strips are difficult to apply due to the fact that the rubber attachment points tend to mushroom outwardly when they are forced into the attachment apertures, making it very difficult to attach the strip. Obviously, if the rubber in the attachment points is sufficiently hard to prevent mushrooming, it likewise is sufficiently low in elastomeric qualities to form a seal. Therefore, it is desirable that this rubber-like material be of a relatively soft nature so that a positive seal is provided.

The present invention overcomes all of these past difficulties in that the sealing strip made from sponge rubber or other spongy, elastomer has a backing member or part of solid elastomeric material including spaced attachment points integrally associated therewith. Each of these attachment points includes rigid means therein which permits assembly of the strip to the supporting structure by pressure applied to the strip on the opposite side thereof from the attachment point. By proceeding in this manner, the rigid portion causes the attachment point to elongate slightly so that it passes more freely through the attachment aperture and then, when pressure is relieved, the attachment point again regains its original shape whereby a positive seal is formed with the supporting structure.

Further objects and advantages of the present invention will be apparent from the following description, reference being had to the accompanying drawings wherein preferred embodiments of the present invention are clearly shown.

In the drawings:
FIGURE 1 is a view in perspective of a backing strip showing two attachment points thereon.

FIGURE 5 is a view in perspective of another type of backing strip.

FIGURE 6 shows the backing strip of FIGURE 5 attached to a sealing strip prior to vulcanization thereof.

FIGURE 7 shows the assembly of FIGURE 6 in a mold preparatory to forming attachment points along the strip.

FIGURE 8 is a longitudinal section taken on line 8—8 of FIGURE 7.

FIGURE 9 is a sectional view of a formed strip prior to final vulcanization showing the applicatoin of a rigid pressure member therein.

FIGURE 10 is a view of the strip within a mold ready for final cure or vulcanization.

Figure 1:
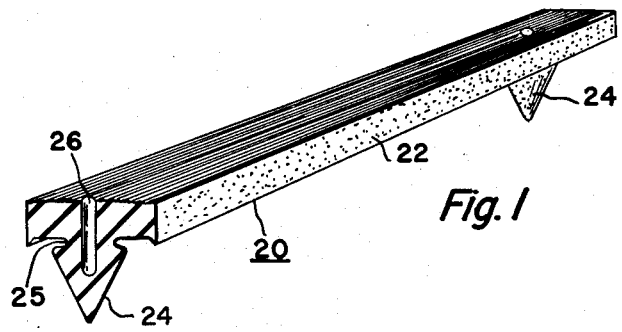
Figure 2:
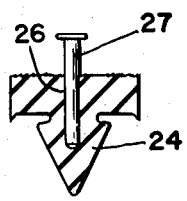
FIGURE 2 is a sectional view of the strip shown in FIGURE 1 through one of the attachment points and includes a rigid pressure member inserted in the attachment point.

In practice, a backing member 20 is formed including a flat strip of elastomeric material 22 which includes a plurality of spaced conical attachment points 24 integrally formed therealong. It is apparent that this type of a strip may be made in a mold without any difficulty. Each attachment point 24 includes a hollowed-out portion 26 therein which extends to the surface of the main strip 22. Rigid pressure members, such as headed nails, 27 are placed in each of the hollowed-out portions 26 prior to subsequent operations on the strip. The nails are inexpensive and easy to apply. In place of metallic nails, small plastic rods or any suitable rigid material may be used.

Figure 3:
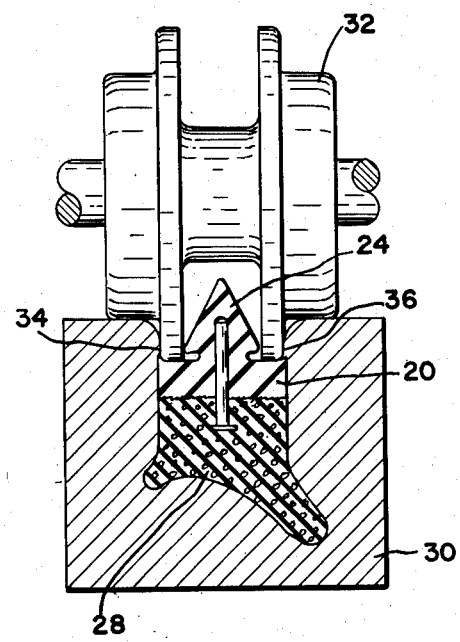
FIGURE 3 shows a means for applying the backing strip to the foamed elastomer while the elastomer is in a mold whereby the entire assembly may be vulcanized or cured simultaneously so that the backing strip and the sealing portion of the strip are bonded coextensively one to the other.

The backing strip is next preferably vulcanized or partially vulcanized as desired and is then applied to a foam rubber strip in a mold as shown in FIGURE 3. Here, the foam or sponge rubber 28, in proper quantities, is placed in the cavity of a mold 30 to the desired level, the strip 20 is inverted thereover and impressed therein by suitable means such as a roller 32. The mold may include overhanging, longitudinally extending lips 34 and 36 which will maintain the backing member 20 in positive position. Thereafter, the foam may be cured and vulcanized directly to the backing member 20 so that a coextensive bond exists between the two.

In this connection, it is apparent that the foam rubber portion of the sealing strip may be completely formed prior to the application of the backing member which may be applied by means of an adhesive cement or the backing strip 20 may be applied to the mold during the time that the foam is rising therein, if it is a foam capable of rising, such as for example, a polyurethane material or a sponge compound. All of these expedients are well known in the art and it is understood that the specific steps in the manufacture of this strip form no part of the invention which is directed to the strip per se.

Figure 4:
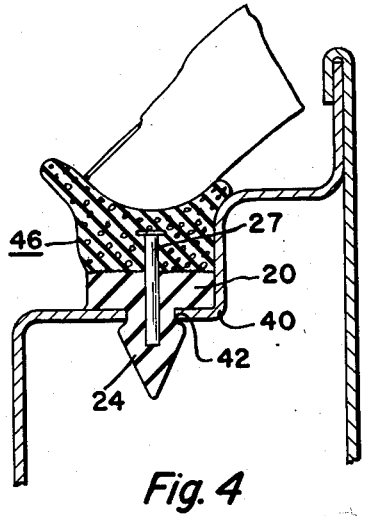
FIGURE 4 is a view in section showing the application of one attachment point to a sheet metal member wherein a finger is pressing adjacent the end of the rigid member for elongating the attachment point.

FIGURE 4 shows the finished strip being applied to a supporting panel 40. This panel 40 includes apertures 42 therethrough and a finished strip 46 is shown being attached to the panel 40 by finger pressure applied to the top surface of the strip and against the end of the rigid member 27. This causes an elongation of the conical attachment point 24 which causes a necking out thereof whereby the grooved part 25 may be snapped onto the sheet metal of the panel 40. As soon as the finger pressure is relieved, the attachment point 24 again resumes its original shape and locks the strip in place.

Another method for making the strip resorts to extrusion processes and is shown in FIGURES 5 through 10. In this instance, a backing member 60 is formed from suitable rubber-like material by extrusion. Thereafter, sponge material may be extruded onto the surface thereof as at 62. In this connection, a closed cell sponge, such as a closed cell neoprene sponge, may be used. The backing strip 60 with the sponge layer 62 thereon is next placed on a mold 63 having a plurality of spaced conical cavities 64 therealong. These cavities may be filled with the same compound as is used in the strip or each of the cavities 64 may include a small quantity of expandable rubber-like material 66 of a nature similar to the foam in the portion 62. This mold may then be heated slightly to cause attachment and expansion of the pellets 66 to form the conical attachment points which will now be in juxtaposed relation and coextensively engaged with the backing member 60. The rigid pins 27 are then merely pressed through the sponge as shown in FIGURE 9 and into the attachment points. Thereafter, the top half of the mold 70 is placed on the bottom portion thereof 63 and the entire assembly is cured or vulcanized. During this procedure, the expendable material in the portion 62 further expands to close the portions thereof through which the pins 27 were pressed and, also, to assume the desired configuration as shown in FIGURE 10. It will be noted that, in all of the other figures, the sponge portions are straight-sided so that the upper mold section 70 may be pressed thereon. After being fully cured, however, it assumes a different shape including re-entrant angles. Due to the mobile nature of the strip, the mold 70 may be easily removed therefrom. The sponge portion may include a longitudinally extending void 65 thereon if desired to improve flexibility.

In all cases, the mold should be properly coated with a lubricant material or other mold release agent such as carbo-wax, soap, etc., as is well known in the art.

The sponge or foam portion of the strip may be made from foamed latex or blown sponge material, either open or closed cell as desired. This material may be selected from useful elastomeric compounds such as natural rubber, rubbery butadiene styrene copolymers, rubbery butadiene acrylonitrile copolymers, polychloroprene, polyurethane, vinyls or any compatible mixtures of any of these materials since it is to be understood that the specific material is of no importance here. The backing and attachment portions of the strip are made of compatible rubber-like materials which may be bonded coextensively to the foam or sponge portion thereof either by coincident vulcanization or curing or through the use of suitable cements.

It is understood that this invention is directed to the combination of a spongy strip including a resilient backing member having spaced attachment points wherein each attachment point includes a rigid means incorporated therewith for facilitating attachment of the strip to a supporting member.

While the embodiments of the present invention as herein disclosed constitute preferred forms, it is to be understood that other forms might be adopted.

What is claimed is as follows:

1. A flexible sealing strip adapted to be attached to an aperture support, comprising, an elongate elastomeric sealing member, an elongate elastomeric reinforcement coextensively arranged and attached to said sealing member, a plurality of spaced attachment means integrally formed on said reinforcement and extending outwardly therefrom, and a plurality of separate rigid pressure members, one of which is provided for each attachment means, said pressure members extending a substantial distance within said attachment means and also extending into said elastomeric sealing member, said pressure members being adapted to facilitate insertion of said attachment means into the apertures of the support.

2. The flexible sealing strip claimed in claim 1 wherein the pressure members are headed rods with the head portion thereof being positioned within the sealing member.

3. The flexible sealing strip claimed in claim 1 wherein said pressure members are metal nails, 4. The flexible sealing strip claimed in claim 1 wherein the pressure members are plastic rods.

5. A flexible sealing strip adapted to be attached to an apertured support, comprising, an elongated elastomeric sealing member made of cellular material, and elongated elastomeric backing strip for said sealing member made from noncellular elastomeric material and coextensively attached to said sealing member, a plurality of elastomeric attachment means integrally formed in spaced relation along said backing strip and extending outwardly therefrom, and a plurality of separate rigid pressure members, one of which is provided for each attachment means, said pressure members extending a substantial distance within the attachment means and passing through the backing strip and into said sealing member and being adapted to facilitate insertion of the attachment means into the apertures of the support to which the strip is to be attached.

6. The flexible sealing strip claimed in claim 5 wherein the pressure members are headed rods with the head being positioned in the sealing member.

7. A flexible sealing strip adapted to be attached to an apertured support, comprising, an elongated elastomeric sealing member made of cellular material having a sealing lip and a backing portion opposed thereto, an elongated backing strip for said sealing member made from noncellular elastomeric material and coextensively attached to the backing portion of said sealing member a plurality of elastomeric attachment means integrally formed along said backing strip and extending outwardly therefrom, each of said attachment means being of substantially conical shape and having a reduced diameter neck portion adjacent the junction of the attachment means and the backing strip, the reduced diameter neck portion having a width slightly less than the thickness of the support to which the strip is to be attached, and a plurality of separate rigid pressure members, one of which is provided for each attachment means, said pressure members extending a substantial distance within said attachment means and past said neck portions and also extending into said elastomeric sealing member whereby pressure applied to the end of said pressure members opposite to the end which is positioned in said attachment means causes an elongation and reduction in diameter of the attachment means to facilitate insertion thereof into the apertures of the support whereby, when the pressure is relieved, the attachment means enlarges and seals the aperture.

8. The flexible sealing strip claimed in claim 7 wherein the pressure members are headed rods wherein the head portion thereof extends into the sealing member.

References Cited in the file of this patent

UNITED STATES PATENTS

| | | |
|---|---|---|
| 2,455,669 | Gagnier | Dec. 7, 1948 |
| 2,516,204 | Hadley | July 25, 1950 |
| 2,716,787 | Harris | Sept. 6, 1955 |
| 2,935,770 | Gagnier | May 10, 1960 |